US010626324B2

(12) United States Patent
AlKhaldi et al.

(10) Patent No.: US 10,626,324 B2
(45) Date of Patent: *Apr. 21, 2020

(54) DOUBLE EMULSIFIED ACIDS AND METHODS FOR PRODUCING AND USING THE SAME

(71) Applicant: Saudi Arabian Oil Company, Dhahran (SA)

(72) Inventors: Mohammed Habib AlKhaldi, Dhahran (SA); Tariq Abdulsattar AlMubarak, Bryan, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,029

(22) Filed: Sep. 4, 2019

(65) Prior Publication Data

US 2019/0390102 A1    Dec. 26, 2019

Related U.S. Application Data

(63) Continuation of application No. 15/860,734, filed on Jan. 3, 2018, now Pat. No. 10,457,858.

(51) Int. Cl.
*E21B 41/02*    (2006.01)
*C09K 8/74*    (2006.01)
(Continued)

(52) U.S. Cl.
CPC ............... *C09K 8/74* (2013.01); *C09K 8/36* (2013.01); *C09K 8/64* (2013.01); *C09K 8/72* (2013.01);
(Continued)

(58) Field of Classification Search
CPC ........ C09K 8/74; C09K 2208/14; E21B 41/02; E21B 43/25
See application file for complete search history.

(56) References Cited

U.S. PATENT DOCUMENTS 4,233,165 A * 11/1980 Salathiel ................. C09K 8/50
166/271
4,714,566 A   12/1987 Takahashi et al.
(Continued)

FOREIGN PATENT DOCUMENTS

EP          2077106 A1      7/2009

OTHER PUBLICATIONS

Office Action dated Sep. 13, 2019 pertaining to U.S. Appl. No. 16/513,891, filed Jul. 17, 2019, 20 pgs.
(Continued)

*Primary Examiner* — Silvana C Runyan
(74) *Attorney, Agent, or Firm* — Dinsmore & Shohl LLP

(57) ABSTRACT

Embodiments of the present disclosure are directed to double emulsified acids, specifically water in oil in water (W/O/W) double emulsions with an acidic interior water phase. The double emulsified acid may include two or more emulsifying agents. In addition to improving the stability of the emulsions, the emulsifying agents may help slow the acid reaction rate. The first emulsifying agent may have an HLB greater than 7 and the second emulsifying agent may have an HLB less than or equal to 7. Other embodiments are directed to methods for producing a double emulsified acid and methods for acidizing a carbonate formation including a double emulsified acid.

9 Claims, 1 Drawing Sheet

(51) Int. Cl.
  *E21B 43/25* (2006.01)
  *C09K 8/36* (2006.01)
  *C09K 8/64* (2006.01)
  *C09K 8/72* (2006.01)
  *C09K 8/528* (2006.01)

(52) U.S. Cl.
  CPC .............. *E21B 41/02* (2013.01); *E21B 43/25* (2013.01); *C09K 8/528* (2013.01); *C09K 2208/14* (2013.01)

(56) References Cited

U.S. PATENT DOCUMENTS

| | | |
|---|---|---|
| 6,793,025 B2 | 9/2004 | Patel et al. |
| 8,349,771 B2 | 1/2013 | Seth et al. |
| 9,234,126 B2 | 1/2016 | Karale |
| 2011/0303414 A1 | 12/2011 | Seth et al. |
| 2012/0043086 A1* | 2/2012 | Al-Mutairi ............... C09K 8/78 166/310 |
| 2013/0126176 A1* | 5/2013 | Al-Mutairi ............... C09K 8/54 166/308.2 |
| 2018/0327654 A1 | 11/2018 | Kalgaonkar |

OTHER PUBLICATIONS

Office Action dated Oct. 9, 2019 pertaining to U.S. Appl. No. 16/557,101, filed Aug. 30, 2019, 11 pgs.

Dolomite, "Water in Mineral Oil in Water(W-O-W) Double Emulsion Production Using SDS, PGPR and Tween 80 as Emulsifiers", The Dolomite Centre Ltd. pp. 1-20.

Kanouni, M et al. "Preparation of a stable double emulsion (W1/O/W2): role of the interfacial films on the stability of the system" Advances in Colloid and the Interface Science, Dec. 1, 2002, pp. 229-254, vol. 99, No. 3.

International Search Report and Written Opinion pertaining to the International Patent Application PCT/US2018/049071 dated Nov. 23, 2018.

* cited by examiner

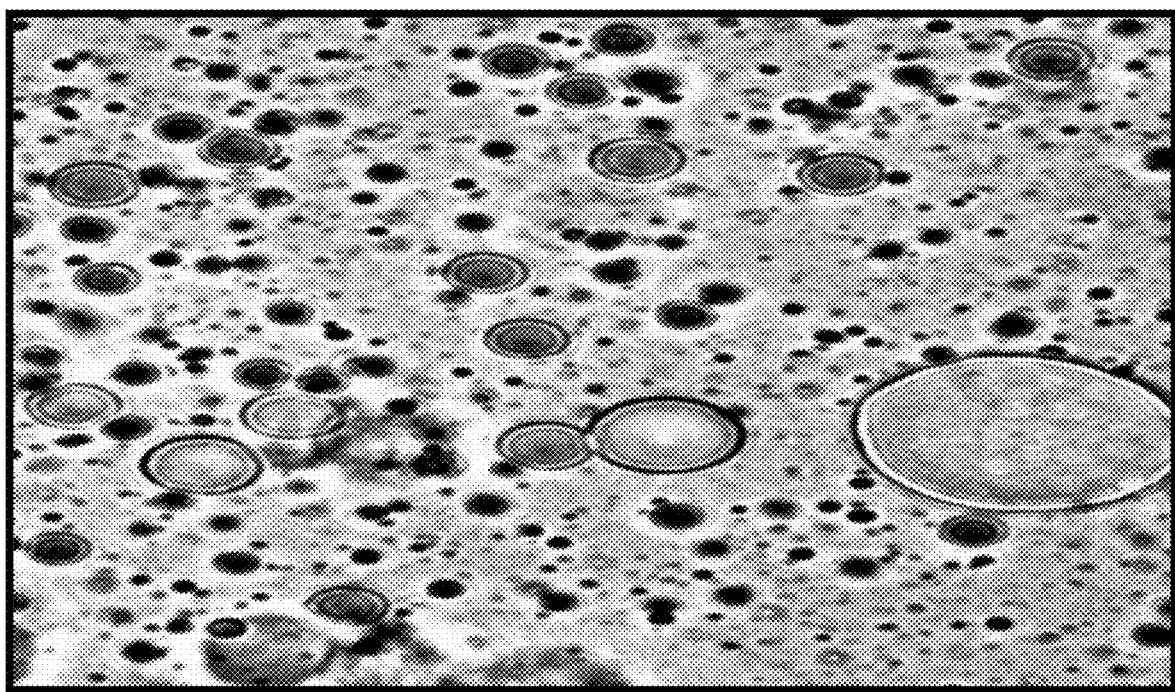

DOUBLE EMULSIFIED ACIDS AND METHODS FOR PRODUCING AND USING THE SAME

CROSS REFERENCE TO RELATED APPLICATION

This application is a continuation application of U.S. patent application Ser. No. 15/860,734 filed Jan. 3, 2018, the entire disclosure of which is hereby incorporated herein by reference.

BACKGROUND

Technical Field

This disclosure relates to double emulsions. More specifically, this disclosure relates to acidic double emulsions and methods of preparing and using acidic double emulsions.

Background

In oil and gas drilling, wellbore stimulation is a common treatment performed in subterranean formations to enhance or restore the productivity of oil and gas from a wellbore. Acid treatments, as detailed in this disclosure, may be used for wellbore stimulation. Acidizing is a stimulation acid treatment technique in which a treatment fluid comprising aqueous acid solution is delivered into the subterranean formation to dissolve acid-soluble materials, such as carbonates. In a functioning wellbore, the formation rock is porous and allows for the flow of gas and oil from the formation to the wellbore. Carbonate formations can block or obstruct this flow of gas or oil. These carbonate formations may impact the productivity of a wellbore. Acidic solutions may be utilized to acidize the carbonate formations and improve the productivity of the wellbore. This can increase the permeability of a treatment zone and enhance well production by increasing the effective wellbore radius.

Conventional acids react very quickly in carbonate formations. The reaction is so rapid in great temperatures that it is impossible for acid to penetrate, or wormhole, more than a few inches into the formation. In such cases, the acid is rendered ineffective in stimulating the wellbore. Compositions known in the art that attempt to solve this problem, such as single emulsified acids, are relatively viscous and cannot be efficiently pumped at fast rates or into environments with extreme pressures, that is, static reservoir pressures above 10,000 pounds per square inch.

SUMMARY

Accordingly, ongoing needs exist for acid formulations which slow the acid reaction rate to allow for deeper wellbore penetration by acidizing stimulation. Further, needs exist for acid formulations with a retarded reaction rate and rheological properties conducive to fast pumping rates and high temperature and high pressure ("HTHP") environments. As used in this disclosure, HTHP environments refer to environments where temperatures can range from 150° C. to 320° C. and static reservoir pressures can range from 10,000 pounds per square inch (psi) to 20,000 psi.

Embodiments of the present disclosure are directed to double emulsified acids, specifically water in oil in water (W/O/W) double emulsions with an acidic interior water phase. The double emulsified acid may include two or more emulsifying agents. In addition to improving the stability of the emulsions, the emulsifying agents may help slow the acid reaction rate.

In one embodiment, a double emulsified acid comprises a continuous aqueous phase and a non-continuous invert emulsion phase. The non-continuous invert emulsion phase may comprise an exterior oil phase, an internal acid phase, and a first emulsifying agent with a hydrophilic-lipophilic balance (HLB) greater than 7. A second emulsifying agent having an HLB less than or equal to 7 may stabilize the non-continuous invert emulsion phase within the continuous aqueous phase. The internal acid phase may comprise from 1 percent by weight (wt. %) to 99 wt. % of at least one acid and from 1 wt. % to 99 wt. % water, based on the total weight of the internal acid phase.

In another embodiment, a method for producing a double emulsified acid comprises introducing an aqueous acid to a first vessel and introducing an oil-based composition and a first emulsifying agent having an HLB greater than 7 to a second vessel. The method further comprises mixing the contents of the first vessel and the contents of the second vessel at a first shear rate to form an invert emulsion. The method may further comprise mixing the invert emulsion with water and a second emulsifying agent having an HLB less than or equal to 7 at a second shear rate to form a double emulsified acid.

In yet another embodiment, a method for acidizing a carbonate formation comprises introducing a double emulsified acid to the carbonate formation. In such embodiments, the double emulsified acid may comprise a continuous aqueous phase and a non-continuous invert emulsion phase. The non-continuous invert emulsion phase may comprise an exterior oil phase, an internal acid phase, and a first emulsifying agent having an HLB greater than 7. In one or more embodiments, a second emulsifying agent having an HLB less than or equal to 7 stabilizes the non-continuous invert emulsion phase within the continuous aqueous phase. In other embodiments, the internal acid phase comprises from 1 percent by weight (wt. %) to 99 wt. % of at least one acid and from 1 wt. % to 99 wt. % water, based on the total weight of the internal acid phase. The method for acidizing the carbonate formation may further comprise maintaining the double emulsified acid in the carbonate formation such that the double emulsion breaks, where the at least one acid dissolves at least part of the carbonate formation, acidizing the carbonate formation.

BRIEF DESCRIPTION OF THE DRAWINGS

FIG. 1 depicts a microscopic image of a double emulsified acid, according to one or more embodiments of the present disclosure.

The embodiments set forth in the drawings are illustrative in nature and not intended to be limiting to the claims. Moreover, individual features of the drawings will be more fully apparent and understood in view of the detailed description.

DETAILED DESCRIPTION

Embodiments of the present disclosure are directed to a double emulsified acid comprising a continuous aqueous phase, a non-continuous invert emulsion phase, and an emulsifying agent with an HLB less than or equal to 7. In one or more embodiments, the non-continuous invert emulsion phase comprises an exterior oil phase, an internal acid phase, and an emulsifying agent with an HLB greater than 7. In other embodiments, the internal acid phase comprises from 1 wt. % to 99 wt. % of at least one acid and from 1 wt. % to 99 wt. % water based on the total weight of the internal acid phase.

As used in the present disclosure, an "emulsion" refers to a mixture comprising immiscible phases, where one immiscible phase is dispersed evenly throughout the other immiscible phase. The phase that is dispersed is referred to as the non-continuous phase or internal phase. The other phase, the phase that surrounds the dispersed phase, is referred to as the continuous phase or exterior phase. Most emulsions described in the present disclosure involve immiscible aqueous phases and oil phases. Emulsions with external water phases are often referred to as just "emulsions" while emulsions with external oil phases may be referred to as "invert emulsions."

As used in the present disclosure, a "double emulsion" refers to either an emulsion or an invert emulsion where the non-continuous phase, dispersed evenly throughout the continuous phase, comprises either an emulsion or an invert emulsion. By way of example and not limitation, one such double emulsion would include an oil based continuous phase with an emulsion non-continuous phase, where the non-continuous phase comprises an emulsion with both an aqueous exterior phase and an oil based internal phase.

As used in the present disclosure, "HLB" refers to Griffin's hydrophilic-lipophilic balance of a molecule. The HLB value of a molecule is a measure of the degree to which it is hydrophilic or lipophilic. HLB may be calculated according to Equation 1:

$$HLB = 20 * \frac{M_h}{M} \quad \text{Eq. (1)}$$

where $M_h$ is the molecular mass of the hydrophilic portion of the molecule and M is the molecular mass of the whole molecule. Griffin's HLB values range from 0 to 20 in which a value of 0 indicates an absolutely hydrophobic/lipophilic molecule and a value of 20 corresponds to an absolutely hydrophilic/lipophobic molecule. Generally, molecules having an HLB less than 10 are lipid soluble, molecules having an HLB greater than 10 are water soluble, and molecules with an HLB between 3 and 16 have some surfactant properties.

As further background, a subterranean wellbore, or just "wellbore," is a drilled or bored hole that includes the open hole and the rock, dirt, sand, or stone that bounds the open hole. A wellbore is formed by inserting a drill string into a previously drilled hole. The drill string may then be rotated about an annular axis causing the drill bit to cut into the surrounding subterranean formation and thereby expanding the hole. The surrounding formation may vary in composition and may include rock, dirt, sand, stone, or combinations thereof.

The wellbore is generally drilled in proximity to a target hydrocarbon formation. The formation surrounding the wellbore is porous and allows for the target oil or gas to flow from the formation to the wellbore. This flowing of target oil or gas to the wellbore enables the extraction of the target oil or gas through the wellbore.

During drilling operations, geologic carbonate formations may be present near or around the desired oil or gas bearing formations and wellbore. These carbonate formations can negatively impact the productivity of a wellbore. To mitigate the impact these carbonate formations have on the productivity of the wellbore, the wellbores may be treated with acidic formulations.

Over time, the production of a wellbore may decrease. This may be due to several factors including, but not limited to, obstructions in the wellbore, decreased permeability of the surrounding formation, or damage to the wellbore from drilling or extraction procedures. There are many potential obstructions that may present in the wellbore. For example, when drilling muds filter into the surrounding formation they can obstruct the pores or channels through which target oil or gas fluids flow. Alternatively, water injection may also lead to obstructions in the wellbore. The injected water or other aqueous solutions may have particles of size sufficient to obstruct the channels in the formation.

These obstructions may decrease wellbore productivity, a general measure of how much target oil or gas can be extracted from a wellbore. Wellbore productivity may be measured by the pressure at which the target formation flows through the wellbore. Alternatively, wellbore productivity may be quantified by the total mass of target fluid extracted through the wellbore.

Drilling and extraction procedures may affect the surrounding formation. These procedures can cause shifts in the constituent materials of the formation and lead to decreased wellbore productivity. For example, drilling into the formation can cause sandstone or carbonate formations to shift and obstruct channels that carry target fluids to the wellbore. Alternatively, carbonates and other solids may precipitate out of drilling muds, workover fluids, or other solutions used in the drilling and extraction process. These solids can obstruct channels that facilitate the flow of target fluids and decrease wellbore productivity.

The purpose of any acid treatment is to improve wellbore productivity. There are three general categories of acid treatments: acid washing, acid fracturing, and acidizing. The type of treatment used generally depends on the formation composition and formation permeability. The formation composition may comprise carbonate, sand, shale, sandstone, other geologic formations, or combinations thereof. The formation permeability is the ability of a fluid to flow through the formation in its natural state.

Acidizing involves adding acid into a wellbore at a pressure less than fracturing pressure. Because acidizing occurs at a pressure less than the corresponding acid fracturing pressure, it is generally easier to control and direct the flow of the acid in an efficient manner. The problem with this type of acid treatment, using conventional acids, is that the acid reacts with the carbonate too quickly and cannot permeate, or wormhole, into less permeable formations. The double emulsified acids of the present disclosure solve this problem by sequestering the acidic phase within an oil phase and within an exterior aqueous phase.

During acidizing operations, the acid is generally chemically consumed and neutralized as the target formation is dissolved. For a general acid, HA (with conjugate anion, A−), reacting with a general carbonate, $MCO_3$, this reaction proceeds according to Equation 2:

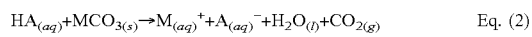
$$HA_{(aq)} + MCO_{3(s)} \rightarrow M^+_{(aq)} + A^-_{(aq)} + H_2O_{(l)} + CO_{2(g)} \quad \text{Eq. (2)}$$

As is apparent from the chemical equation, the carbonate is dissolved into the aqueous acid solution and carbon dioxide is evolved. Further, the amount of carbon dioxide evolved is directly proportional to the amount of carbonate dissolved. This reaction generally occurs instantaneously and proceeds to completion quickly. Using double emulsified acids, this reaction occurs at a slower rate, enabling the acidizing solution to wormhole further into the carbonate formation.

Two substances cannot undergo a chemical reaction unless the constituent molecules, ions, or atoms come into contact. As a consequence, the more reactant particles that collide with each other per unit time, the faster the reaction will proceed. Therefore, the rate at which a chemical reaction proceeds may be affected by reactant concentrations, temperature, physical states and surface areas of reactants, and properties of non-reacting compounds in the reaction solution. All of these factors can affect the collision rate of reactants.

The double emulsified acids of the present disclosure sequester the acidic reactant particles from the formation wall. Therefore, the acid can only react with carbonate formations when the double emulsion is broken, exposing the acid to the formation. As used in the present disclosure, the "breaking" of an emulsion or double emulsion refers to the dissolution of the component phases. When an emulsion breaks, its interfacial film is interrupted and droplets of the immiscible phases coalesce. The requirement of breaking the double emulsion to contact the acid to the formation wall slows down the collision rate of the reactants, namely the acid ions and carbonate solids, thereby slowing down the reaction rate.

In one or more embodiments, a double emulsified acid comprises a continuous aqueous phase and a non-continuous invert emulsion phase. In one or more embodiments, the non-continuous invert emulsion phase comprises an exterior oil phase, an internal acid phase, and a first emulsifying agent with an HLB greater than 7. In one or more embodiments, a second emulsifying agent having an HLB less than or equal to 7 stabilizes the non-continuous invert emulsion phase within the continuous aqueous phase. In other embodiments, the internal acid phase comprises from 1 percent by weight (wt. %) to 99 wt. % of at least one acid and from 1 wt. % to 99 wt. % water, based on the total weight of the internal acid phase.

In one or more embodiments, the continuous aqueous phase comprises from 0.1 wt. % to 99.9 wt. % water, based on the total weight of the continuous aqueous phase. In other embodiments, the continuous aqueous phase may comprise salts, clay stabilizers, corrosion inhibitors, or organic solvents. Suitable salts include, by way of example and not limitation, lithium salts, sodium salts, potassium salts, beryllium salts, magnesium salts, calcium salts, transition metal salts, halides, oxides, sulfides, selenides, phosphides, sulfates, sulfites, phosphates, and phosphites. In one or more embodiments, the continuous aqueous phase comprises greater than 0.1 wt. % total dissolved solids, based on the total weight of the continuous aqueous emulsion phase. In other embodiments, the continuous aqueous emulsion phase comprises from 0.1 wt. % to 50 wt. %, from 0.1 wt. % to 10 wt. %, from 0.1 wt. % to 5 wt. %, or from 1 wt. % to 10 wt. % based on the total weight of the continuous aqueous phase.

In one or more embodiments, the continuous aqueous phase may comprise clay stabilizers. As used in the present disclosure, a clay stabilizer refers to a chemical additive that prevents the swelling or migration of clay particles into a wellbore fluid from the surrounding formation. When aqueous fluids are circulated in a wellbore, the water in the fluid can affect the electrical charge of clay platelets in the surrounding formation. As the electrical charges of the clay platelets are changed, the clay may swell, that is absorb water into the crystalline structure of the clay. As the clay platelets swell, they may more easily break off from the surrounding formation and infiltrate the wellbore fluid. Example clay stabilizers include, but are not limited to, ionic salts, polyacrylamide polymers, and polyacrylate polymers.

In one or more embodiments, the clay stabilizer of the continuous aqueous phase may comprise KCl, NaCl, $NH_4Cl$, tetramethylammonium chloride (TMAC), or combinations thereof. In other embodiments, the continuous aqueous phase comprises from 1 wt. % to 8 wt. % of at least one clay stabilizer based on the total weight of the continuous aqueous phase. Without being limited by theory, it is believed these clay stabilizers may prevent the circulating aqueous fluid from affecting the electrical properties of the clay platelets, preventing infiltration of the clay into the fluid.

In one or more embodiments, the continuous aqueous phase may comprise one or more corrosion inhibitors. Corrosion inhibitors are chemicals that may be added to acidic wellbore fluids to prevent the acid in the fluid from corroding iron, steel, and other metal components of the wellbore. In one or more embodiments, a double emulsified acid may be pumped through metal coiled tubing. In such embodiments, corrosion inhibitors in the double emulsified acid protect the integrity of the metal coiled tubing. Additionally, hydrogen sulfide in the wellbore or surrounding formation may cause corrosion, known in the art as "sour corrosion." Suitable corrosion inhibitors may have no effect on the reaction rate between acid and carbonates while reducing the reaction between acids (or hydrogen sulfide) and wellbore metals. Example corrosion inhibitors include, but are not limited to, amines, ammonia, quaternary ammonium salts, morpholine, oxygen scavengers, and thiourea.

In one or more embodiments, the continuous aqueous phase may comprise one or more organic solvents. Relatively small quantities of organic solvents may be incorporated into the continuous aqueous phase to allow for the consistent, uniform dispersion of fluid additives and the internal invert emulsion phase. In one or more embodiments, the continuous aqueous phase comprises from 0.01 wt. % to 5 wt. % organic solvents, based on the total weight of the continuous aqueous phase. In other embodiments, the continuous aqueous phase comprises from 0.01 wt. % to 1 wt. %, from 0.1 wt. % to 5 wt. %, from 0.01 wt. % to 0.5 wt. %, or from 0.01 wt. % to 0.1 wt. %, based on the total weight of the continuous aqueous phase. One or more organic solvents may include, but are not limited to, acetone, acetonitrile, diesel, dimethylformamide, dimethyl sulfoxide, ethylene glycol, ethyl acetate, hexanes, nitromethane, pentanes, propylene carbonate, tetrahydrofuran, and xylene.

In one or more embodiment double emulsified acids, the non-continuous invert emulsion phase comprises an exterior oil phase, an internal acid phase, and a first emulsifying agent with an HLB greater than 7. The exterior oil phase of the non-continuous invert emulsion phase may comprise mineral oil, synthetic oils derived from plant or animal products, diesel, $C_{12}$-$C_{20}$ hydrocarbons, or combinations thereof. On such synthetic oil, by way of example and not limitation, is safra oil, a commercially available oil from the Safra Company Limited (Saudi Arabia). As used in the present disclosure, "$C_{12}$-$C_{20}$ hydrocarbons" refers to hydrocarbons, that are compounds comprising hydrogen and carbon, having from 12 to 20 carbon atoms. In one or more embodiments, the $C_{12}$-$C_{20}$ hydrocarbons comprise olefins. In other embodiments, the $C_{12}$-$C_{20}$ hydrocarbons comprise linear alpha olefins.

The internal acid phase of the non-continuous invert emulsion phase may comprise from 1 wt. % to 99 wt. % of at least one acid and from 1 wt. % to 99 wt. % water, based on the total weight of the internal acid phase. In other embodiments, the internal acid phase may comprise from 5 wt. % to 99 wt. %, from 10 wt. % to 99 wt. %, from 25 wt. % to 99 wt. %, from 40 wt. % to 99 wt. %, from 25 wt. % to 75 wt. %, or even from 50.1 wt. % to 99 wt. % of at least one acid, based on the total weight of the internal acid phase. In one or more embodiments, the internal acid phase may comprise from 1 wt. % to 5 wt. %, from 1 wt. % to 90 wt. %, from 1 wt. % to 75 wt. %, from 1 wt. % to 60 wt. %, from 25 wt. % to 75 wt. %, or from 1 wt. % to 49.9 wt. % water, based on the total weight of the internal acid phase.

Acid strength is characterized by how well a particular acid dissociates and donates protons. A stronger acid is an acid that dissociates at a frequent rate and donates a comparatively greater concentration of protons. A weaker acid does not donate protons as well because it dissociates at a less frequent rate, resulting in a comparatively lesser concentration of protons. Acid strength can be quantified by the logarithmic acid dissociation constant, $pK_a$. The $pK_a$ of an acid may be defined as the negative logarithm quotient of the concentration of conjugate anions multiplied by concentration of donated protons, divided by the concentration of undissociated acid. Acids with $pK_a$s less than 5 may be desirable for some acidizing operations because they dissociate at a frequent rate, resulting in a more complete reaction and less unreacted acid remaining in the formation.

In one or more embodiments, the internal acid phase of the non-continuous invert emulsion phase comprises an acid with a $pK_a$ less than or equal to 5. In other embodiments, at least one acid may comprise an inorganic acid. In still other embodiments, the at least one acid may comprise an organic acid. The at least one acid of the internal acid phase of the non-continuous invert emulsion phase may comprise acetic acid, chloric acid, formic acid, hydrochloric acid, hydrobromic acid, hydrofluoric acid, hydroiodic acid, nitric acid, oxalic acid, perchloric acid, sulfuric acid, sulfurous acid, or combinations thereof. In other embodiments, the internal acid phase may comprise various salts, clay stabilizers, corrosion inhibitors, or organic solvents as described in the present disclosure.

In one or more embodiments, the non-continuous invert emulsion phase comprises a first emulsifying agent with an HLB greater than 7. In other embodiments, the first emulsifying agent has an HLB greater than or equal to 10, or even greater than or equal to 12. In one or more embodiments, a double emulsified acid comprises a second emulsifying agent with an HLB less than or equal to 7. In other embodiments, the second emulsifying agent has an HLB less than or equal to 6, or even less than or equal to 5.

As used in the present disclosure, an emulsifying agent refers to a compound that lowers the surface tension between two immiscible substances. An emulsifying agent, also referred to as an emulsifier, may comprise surfactants, detergents, wetting agents, dispersants, nanoparticles, polyacrylamides, or combinations thereof. In one or more embodiments, an emulsifying agent comprises at least one amphiphilic organic compound. Emulsifying agents can also sequester the acids even after the emulsion breaks, further retarding the reaction rate between the acid and carbonates in the formation. In other embodiments, an emulsifying agent comprises ethoxylated alcohols, alkylphenols, or combinations thereof. In one or more embodiments of the double emulsified acids, the first emulsifying agent and the second emulsifying agent may comprise an ethoxylated alcohol.

In one or more embodiments, a double emulsified acid comprises from 1 wt. % to 96 wt. % continuous aqueous phase, based on the total weight of the double emulsified acid. In other embodiments, the double emulsified acid comprises from 1 wt. % to 45 wt. %, from 5 wt. % to 35 wt. % from 10 wt. % to 30 wt. %, from 10 wt. % to 25 wt. %, from 15 wt. % to 30 wt. %, or from 15 wt. % to 25 wt. % continuous aqueous phase, based on the total weight of the double emulsified acid.

In one or more embodiments, a double emulsified acid comprises from 1 wt. % to 96 wt. % exterior oil phase, based on the total weight of the double emulsified acid. In other embodiments, the double emulsified acid comprises from 1 wt. % to 30 wt. %, from 5 wt. % to 25 wt. %, from 5 wt. % to 20 wt. %, from 10 wt. % to 25 wt. %, or from 10 wt. % to 20 wt. % exterior oil phase, based on the total weight of the double emulsified acid.

In one or more embodiments, a double emulsified acid comprises from 1 wt. % to 96 wt. % internal acid phase, based on the total weight of the double emulsified acid. In other embodiments, the double emulsified acid comprises from 5 wt. % to 65 wt. %, from 15 wt. % to 65 wt. %, from 30 wt. % to 65 wt. %, from 5 wt. % to 45 wt. %, from 15 wt. % to 45 wt. %, or from 30 wt. % to 45 wt. % internal acid phase, based on the total weight of the double emulsified acid.

In one or more embodiments, a double emulsified acid comprises from 1 wt. % to 30 wt. % of a first emulsifying agent with an HLB greater than 7, based on the total weight of the double emulsified acid. In other embodiments, the double emulsified acid comprises from 5 wt. % to 25 wt. %, from 5 wt. % to 20 wt. %, from 10 wt. % to 25 wt. %, or from 10 wt. % to 20 wt. % of a first emulsifying agent with an HLB greater than 7, based on the total weight of the double emulsified acid.

In one or more embodiments, a double emulsified acid comprises from 1 wt. % to 30 wt. % of a second emulsifying agent with an HLB less than or equal to 7, based on the total weight of the double emulsified acid. In other embodiments, the double emulsified acid comprises from 5 wt. % to 25 wt. %, from 5 wt. % to 20 wt. %, from 10 wt. % to 25 wt. %, or from 10 wt. % to 20 wt. % of a first emulsifying agent with an HLB less than or equal to 7, based on the total weight of the double emulsified acid.

One or more embodiments of the present disclosure provide a method for producing a double emulsified acid, the method comprises adding an aqueous acid to a first vessel, adding an oil-based composition and a first emulsifying agent having an HLB greater than 7 to a second vessel, mixing the contents of the first vessel and the contents of the second vessel at a first shear rate to form an invert emulsion, and mixing the invert emulsion with water and a second emulsifying agent with an HLB less than or equal to 7 at a second shear rate to form a double emulsified acid. In one or more embodiments, the first shear rate may be different than the second shear rate.

In one or more embodiments, a method for producing a double emulsified acid may further comprise adding a corrosion inhibitor, an organic solvent, a viscosity modifier, or combinations thereof to the first vessel. In other embodiments, a corrosion inhibitor, an organic solvent, a viscosity modifier, or combinations thereof may be added to the double emulsified acid after mixing at a second shear rate.

As used in the present disclosure, an "aqueous acid" refers to an acidic solution that comprises greater than 0 wt. % of at least one acid and less than 100 wt. % water, based on the total weight of the aqueous acid. The at least one acid in the aqueous acid may refer to organic acids, inorganic acids, or combinations thereof. In other embodiments, the at least one acid in the aqueous acid may refer to acids having a $pK_a$ less than 5, such as, by way of non-limiting example: acetic acid, chloric acid, formic acid, hydrochloric acid, hydrobromic acid, hydrofluoric acid, hydroiodic acid, nitric acid, oxalic acid, perchloric acid, sulfuric acid, sulfurous acid, or combinations thereof.

In one or more embodiment methods for producing a double emulsified acid, the first shear rate is greater than 400 cycles per second ($s^{-1}$). In other embodiments, the first shear rate is from 400 $s^{-1}$ to 2000 $s^{-1}$, from 400 $s^{-1}$ to 1600 $s^{-1}$, from 1000 $s^{-1}$ to 2000 $s^{-1}$, or from 1000 $s^{-1}$ to 1600 $s^{-1}$.

In one or more embodiment methods for producing a double emulsified acid, the second shear rate less than or equal to 2000 $s^{-1}$. In other embodiments, the second shear rate is from 400 $s^{-1}$ to 2000 $s^{-1}$, from 400 $s^{-1}$ to 1600 $s^{-1}$, from 1000 $s^{-1}$ to 2000 $s^{-1}$, or from 1000 $s^{-1}$ to 1600 $s^{-1}$.

In one or more embodiments, a method for acidizing a carbonate formation comprises introducing a double emulsified acid to the carbonate formation, maintaining the double emulsified acid in the carbonate formation such that the double emulsion breaks, where the at least one acid of the double emulsified acid dissolves at least part of the carbonate formation, acidizing the carbonate formation.

In one or more embodiments, the acidizing solution may be need to kept at temperature and pressure conditions different than those near the carbonate formation. In such embodiments, the double emulsified acid may be passed through an insulator prior to being introduced to the carbonate formation. As used in the present context, an insulator refers to a tubular that separates a fluid on the inside of the tubular from the environment outside of the tubular. In one or more embodiments, the double emulsified acid is pumped through and insulator that runs from the surface to the carbonate formation. The insulator may be made out of materials inert to reaction with the double emulsified acid. In one or more embodiments, the insulator is made out of metal, plastic, or other composite materials. Pressure or a vacuum may be applied to the interior of the insulator to adjust the pressure conditions in the insulator as needed. Additionally, the insulator may be heated or cooled to adjust the temperature of the interior of the insulator as needed. As described previously, the formation permeability may affect the rate and pressure at which the double emulsified acid is pumped.

In addition to formation permeability, other factors may contribute to the requisite pumping pressure and rate required to acidize a carbonate formation. For example, HTHP conditions in the wellbore may affect the pumping rate or pressure required to introduce the acidizing solution to a subterranean carbonate formation. In HTHP environments temperatures can range from 150° C. to 320° C. and static reservoir pressures can range from 10,000 pounds per square inch (psi) to 20,000 psi.

Conventional acid emulsions perform poorly in these environments because they are too viscous to efficiently pump into the wellbore. The double emulsified acids of the present disclosure have less viscosity and can be efficiently pumped into the wellbore, even in HTHP environments.

EXAMPLES

In the following examples, the produced double emulsified acid is compared to a conventional emulsified acid. The doubled emulsified acid was measured as having less viscosity and a slower carbonate reaction rate compared to the conventional emulsified acid formulation.

Comparative Example A

A conventional emulsified acid, Comparative Example A, was prepared by adding 90 milliliters (mL) of diesel and 3 mL of AF-70, a commercially available emulsifying agent from the Halliburton Company with an HLB greater than 7, to a multimixer. Then, the diesel and emulsifying agent were mixed at a shear rate of from 400 to 1000 revolutions per minute (rpm) for 1 minute. Finally, 210 mL of a 20 wt. % hydrochloric acid solution were added dropwise over 45 minutes while the diesel, emulsifying agent, and acid mixture was mixed at a shear rate of from 1000 to 2000 rpm.

Example 1

A double emulsified acid, Example 1, was prepared by first adding 90 mL of diesel and 3 mL of AF-70 to a multimixer. Then, the diesel and emulsifying agent were mixed at a shear rate from 400 to 1000 rpm for 1 minute. Next, 210 mL of a 20 wt. % hydrochloric acid solution were added dropwise over 45 minutes while the diesel, emulsifying agent, and acid mixture was mixed at a shear rate of from 1000 to 2000 rpm forming an invert emulsion.

Next, 90 mL of water and 3 mL LoSurf-300, a commercially available emulsifying agent from the Halliburton Company with an HLB less than or equal to 7, are added to a multimixer and mixed at a shear rate from 400 rpm to 1000 rpm for 1 minute. Next, 210 mL of the previously prepared invert emulsion are added dropwise over 45 minutes while the mixture was mixed at a shear rate of from 1000 to 2000 rpm forming a double emulsified acid. The produced double emulsified acid was imaged under a microscope and photographed. As can be seen in FIG. 1, a double emulsion is formed with an aqueous acid phase being entirely surrounded by an oil phase; and the oil phase is entirely surrounded by a continuous aqueous phase. The double emulsion micelles depicted in FIG. 1 have a diameter in the range of from 1 to 20 millimeters.

Viscosity Measurement

The viscosities of Comparative Example A and Example 1 were measured at 25° C. using a FANN-35 viscometer at a shear rate of 100 $s^{-1}$. Comparative Example A had a viscosity of 75 centipoise (cP) and Example 1 had a viscosity of 56 cP. The less viscous double emulsified acid can be pumped at faster rates than the more viscous conventional emulsified acid. Also related to its rheological properties, the less viscous double emulsified acid is more efficient to pump into HTHP environments compared to more viscous conventional emulsified.

Carbonate Reaction Rate

The reaction rates of Comparative Example A with calcium carbonate and Example 1 with calcium carbonate were measured and compared at 25° C. In an container, 10 grams (g) of $CaCO_3$ powder were added to 100 mL of Comparative Example A and allowed to react for four different time intervals: 30 seconds, 1 minute, 2 minutes, and 5 minutes. At the end of each time interval, the solution was filtered and the remaining undissolved mass was measured and subtracted from the initial $CaCO_3$ mass to determine the mass of $CaCO_3$ reacted.

Similarly, 10 g of $CaCO_3$ powder were added to 100 mL of Example 1 and allowed to react for four different time intervals: 30 seconds, 1 minute, 2 minutes, and 5 minutes. As the $CaCO_3$ reacted with the double emulsified acid, $CO_2$ was evolved. At the end of each time interval, the solution was filtered and the remaining undissolved mass was measured and subtracted from the initial $CaCO_3$ mass to determine the mass of $CaCO_3$ reacted. The masses of reacted $CaCO_3$ in Comparative Example A and Example 1 at time intevals of 30 seconds, 1 minute, 2 minutes, and 5 miuntes, are shown in Table 1.

TABLE 1

| Elapsed Time | Comparative Example A CaCO$_3$ Mass Reacted | Example 1 CaCO$_3$ Mass Reacted |
| --- | --- | --- |
| 0.5 minutes | 0.5 g | 0.1 g |
| 1 minute | 1.4 g | 0.4 g |
| 2 minutes | 2.5 g | 1.3 g |
| 5 minutes | 7.5 g | 2.65 g |

As can be seen from Table 1, the double emulsified acid dissolved CaCO$_3$ at a rate slower than the emulsified acid. This is because the double emulsified acid is reacting with the carbonate slower than the conventional emulsified acid.

Further, it will be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

Unless otherwise defined, all technical and scientific terms used in this disclosure have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

It should be understood that any two quantitative values assigned to a property may constitute a range of that property, and all combinations of ranges formed from all stated quantitative values of a given property are contemplated in this disclosure. It should be further understood that any and all ranges provided are inclusive of their respective endpoints.

It will be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

What is claimed is:

1. A double emulsified acid comprising:
    a continuous aqueous phase;
    a non-continuous invert emulsion phase, the non-continuous invert emulsion phase comprising:
        an exterior oil phase;
        an internal acid phase, the internal acid phase comprising:
            from 1 wt. % to 99 wt. % of at least one acid, based on the total weight of the internal acid phase; and
            from 1 wt. % to 99 wt. % water, based on the total weight of the internal acid phase; and
        a first emulsifying agent with a hydrophilic-lipophilic balance (HLB) greater than 7; and
    a second emulsifying agent with an HLB less than or equal to 7.

2. The double emulsified acid of claim 1, where at least one of the emulsifying agents comprises an ethoxylated alcohol.

3. The double emulsified acid of claim 1, where at least one of the first and second emulsifying agents comprises an alkylphenol.

4. The double emulsified acid of claim 1, where at least one acid comprises an acid having a pK$_a$ less than or equal to 5.

5. The double emulsified acid of claim 1, where at least one acid comprises acetic acid, chloric acid, formic acid, hydrochloric acid, hydrobromic acid, hydrofluoric acid, hydroiodic acid, nitric acid, oxalic acid, perchloric acid, sulfuric acid, sulfurous acid, or combinations thereof.

6. The double emulsified acid of claim 1, where the internal acid phase comprises from 25 wt. % to 75 wt. % of at least one acid, based on the total weight of the internal acid phase.

7. The double emulsified acid of claim 1, where the exterior oil phase comprises mineral oil, safra oil, diesel, C$_{12}$-C$_{20}$ hydrocarbons, or combinations thereof.

8. The double emulsified acid of claim 1, where the double emulsified acid comprises:
    from 5 wt. % to 55 wt. % of the continuous aqueous phase;
    from 10 wt. % to 30 wt. % of the exterior oil phase;
    from 5 wt. % to 65 wt. % of the internal acid phase;
    from 10 wt. % to 20 wt. % of the first emulsifying agent with an HLB greater than 7; and
    from 10 wt. % to 20 wt. % of the second emulsifying agent with an HLB less than or equal to 7, based on the total weight of the double emulsified acid.

9. The double emulsified acid of claim 1, wherein the non-continuous invert emulsion phase is entirely surrounded by the continuous aqueous phase.

* * * * *